United States Patent
Kim et al.

(10) Patent No.: US 10,902,772 B2
(45) Date of Patent: Jan. 26, 2021

(54) DISPLAY DRIVING METHOD, DISPLAY DRIVER INTEGRATED CIRCUIT, AND ELECTRONIC DEVICE COMPRISING THE SAME

(71) Applicant: SAMSUNG ELECTRONICS CO., LTD., Suwon-si (KR)

(72) Inventors: Dong Hui Kim, Hwaseong-si (KR); Young Hee Ha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 15/986,876

(22) Filed: May 23, 2018

(65) Prior Publication Data
US 2018/0268774 A1 Sep. 20, 2018

Related U.S. Application Data

(63) Continuation of application No. 14/938,325, filed on Nov. 11, 2015, now Pat. No. 9,997,131.

(30) Foreign Application Priority Data

Nov. 12, 2014 (KR) .................. 10-2014-0157296

(51) Int. Cl.
G09G 5/00 (2006.01)
G09G 3/20 (2006.01)
G09G 3/3225 (2016.01)

(52) U.S. Cl.
CPC ............ *G09G 3/3225* (2013.01); *G09G 3/20* (2013.01); *G09G 2320/0673* (2013.01); *G09G 2330/021* (2013.01); *G09G 2330/028* (2013.01); *G09G 2340/0435* (2013.01); *G09G 2360/16* (2013.01)

(58) Field of Classification Search
CPC .. G09G 3/20; G09G 2320/0673; G09G 5/003; G09G 2340/0435
See application file for complete search history.

(56) References Cited

U.S. PATENT DOCUMENTS

| | | | |
|---|---|---|---|
| 7,605,794 B2 | 10/2009 | Nurmi et al. | |
| 9,324,261 B2 | 4/2016 | Lee | |
| 9,478,704 B2 | 10/2016 | Nishijima et al. | |
| 9,595,216 B2 | 3/2017 | Park et al. | |

(Continued)

FOREIGN PATENT DOCUMENTS

| | | | |
|---|---|---|---|
| CN | 102376249 A | 3/2012 | |
| CN | 103035174 A | 4/2013 | |

(Continued)

OTHER PUBLICATIONS

U.S. Appl. No. 14/938,325, filed Nov. 11, 2015; Kim et al.
(Continued)

*Primary Examiner* — Lixi C Simpson
(74) *Attorney, Agent, or Firm* — Nixon & Vanderhye P.C.

(57) ABSTRACT

A display driver integrated circuit is disclosed. The display driver integrated circuit includes panel signal supply circuitry configured to supply an image signal corresponding to image data to a panel, pixel power supply circuitry configured to supply pixel power to a pixel that receives the image signal, and a controller configured to control the pixel power supply circuitry to supply the pixel power based on an on-pixel ratio (OPR) value of the image data.

20 Claims, 8 Drawing Sheets

(56) References Cited

U.S. PATENT DOCUMENTS

| | | | |
|---|---|---|---|
| 9,997,131 B2* | 6/2018 | Kim | G09G 3/20 |
| 2006/0267972 A1* | 11/2006 | Yi | G09G 3/3648 |
| | | | 345/211 |
| 2007/0115302 A1* | 5/2007 | Huang | G09G 3/3208 |
| | | | 345/690 |
| 2007/0146294 A1 | 6/2007 | Nurmi et al. | |
| 2009/0109147 A1 | 4/2009 | Park | |
| 2010/0277512 A1* | 11/2010 | Shen | G09G 3/2025 |
| | | | 345/690 |
| 2011/0084954 A1* | 4/2011 | Lee | G09G 3/3225 |
| | | | 345/212 |
| 2012/0044273 A1 | 2/2012 | Park | |
| 2013/0082910 A1 | 4/2013 | Lee | |
| 2013/0342585 A1* | 12/2013 | Chun | G09G 3/3208 |
| | | | 345/690 |
| 2014/0313183 A1 | 10/2014 | Harada | |
| 2014/0340379 A1 | 11/2014 | Kim | |
| 2015/0130823 A1 | 5/2015 | Kim | |
| 2015/0170560 A1* | 6/2015 | Lim | G09G 3/3291 |
| | | | 345/691 |

FOREIGN PATENT DOCUMENTS

| | | |
|---|---|---|
| EP | 2 420 990 | 2/2012 |
| JP | 2004-361691 A | 12/2004 |
| JP | 2011-043761 A | 3/2011 |
| JP | 2013-137532 A | 7/2013 |

OTHER PUBLICATIONS

CN Office Action for Application No. 201510776874.0 dated Dec. 5, 2017.
CN Translation for CN O/A No. 201510776874.0.
Extended Search Report dated Mar. 30, 2016 in counterpart European Patent Application No. 15194357.8.

* cited by examiner

DISPLAY DRIVING METHOD, DISPLAY DRIVER INTEGRATED CIRCUIT, AND ELECTRONIC DEVICE COMPRISING THE SAME

CROSS-REFERENCE TO RELATED APPLICATION(S)

This application is a Continuation of U.S. application Ser. No. 14/938,325, filed Nov. 11, 2015, which claims priority to KR 10-2014-0157296, filed Nov. 12, 2014, the entire contents of which are all hereby incorporated herein by reference.

TECHNICAL FIELD

The disclosure relates to a display driving method, a display driver integrated circuit, and an electronic device including the same.

BACKGROUND

A portable electronic device including a display, such as a smart phone, a wearable device, and the like, is coming into wide use. Since the portable electronic device is not always supplied with power from the outside, low power consumption of the portable electronic device and a display included therein have become increasingly important.

The display includes a display panel (hereinafter briefly referred to as "panel") displaying an image screen and a display driver integrated circuit (DDI) driving the panel. The display driver integrated circuit receives image data from the outside, performs image processing with respect to the received image data, and drives the panel by applying an image signal to the panel based on the processed image data.

SUMMARY

Aspects of the disclosure address at least the above-mentioned problems and/or disadvantages and to provide at least the advantages described below. Accordingly, an aspect of the disclosure is to provide a display driving method, a display driver integrated circuit, and an electronic device including the same, capable of diversifying a source of a power to be supplied to a pixel of a panel based on a feature (e.g., an on-pixel ratio (OPR) value) of a screen to be displayed on the panel, thereby achieving low power.

In accordance with an aspect of the disclosure, a display driver integrated circuit may be provided. The display driver integrated circuit may include panel signal supply circuitry configured to supply an image signal corresponding to image data to a panel, a pixel power supply module (or pixel power supply circuit) configured to supply a pixel power to a pixel that receives the image signal, and a control module (or controller) configured to control the pixel power supply circuitry to supply the pixel power based on an OPR value of the image data.

Other aspects, advantages, and salient features of the disclosure will become apparent to those skilled in the art from the following detailed description, which, taken in conjunction with the annexed drawings, discloses various examples of the disclosure.

BRIEF DESCRIPTION OF THE DRAWINGS

The above and other aspects, features, and advantages of the disclosure will be more apparent from the following detailed description taken in conjunction with the accompanying drawings, in which like reference numerals refer to like elements, and wherein.

Throughout the drawings, it should be noted that like reference numbers are used to depict the same or similar elements, features, and structures.

DETAILED DESCRIPTION

Figure 1:
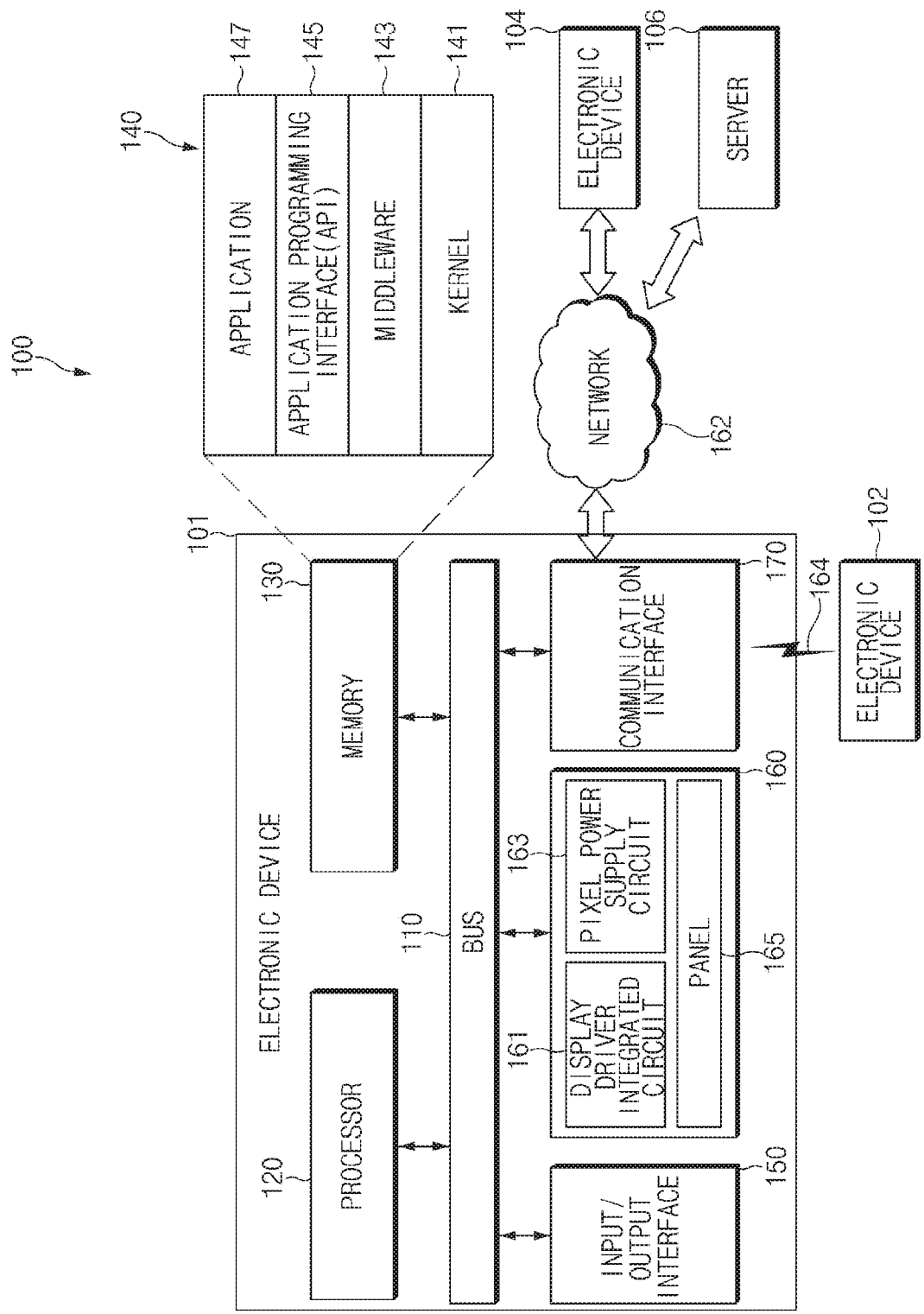
FIG. 1 is a diagram illustrating an example electronic device including a display driver integrated circuit.

Various examples of the disclosure may be described with reference to accompanying drawings. Accordingly, those of ordinary skill in the art will recognize that any modification, equivalent, and/or alternative on the various examples described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various examples of the disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there is no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this disclosure are used to describe specified examples of the disclosure and are not intended to limit the scope of the disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various examples of the disclosure. In some cases, even if terms are defined in the specification, they may not be interpreted to exclude examples of the disclosure.

An electronic device according to various examples of the disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various examples of the disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various examples of the disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers), and the like.

According to certain examples of the disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an example of the disclosure may be one or more combinations of the above-mentioned devices. According to certain examples of the disclosure, an electronic device may be a flexible electronic device. Also, electronic devices according to various examples of the disclosure are not limited to the above-mentioned devices, and may include new electronic devices according to technology development Hereinafter, electronic devices according to an example of the disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an example electronic device including a display driver integrated circuit.

Referring to FIG. 1, there is illustrated an electronic device 101 in a network environment 100 according to various examples of the disclosure. The electronic device 101 may include a bus 110, a processor 120, a memory 130, an input/output (I/O) interface 150, a display 160, and a communication interface 170. According to an example of the disclosure, the electronic device 101 may include less than all of the above-described components or may further include additional component(s).

The bus 110 may interconnect the above-described components 120 to 170 and may, for example, be a circuit for conveying communications (e.g., a control message and/or data) among the above-described components.

The processor 120 may include one or more of a central processing unit (CPU), an application processor (AP), a communication processor (CP), or a graphic processor. The processor 120 may be configured to perform, for example, data processing or an operation associated with control or communication of at least one other component(s) of the electronic device 101.

For example, the processor 120 including at least one AP and the graphics processor may be configured to produce image data according to execution of an application program and may be configured to transfer the image data to the display 160 through the bus 110. The processor 120 may be called "host". According to an example of the disclosure, the processor 120 may be configured to determine an on-pixel ratio (OPR) value of image data.

In this disclosure, the OPR value may be obtained from image data and may include, for example, a ratio (or a number ratio) of pixels, which are supplied with pixel power (i.e., which operate), to all pixels included in a panel 165 of the display 160.

According to an example of the disclosure, the processor 120 may be configured to control a source (e.g., a pixel power supply module included in a display driver integrated circuit 161 or a pixel power supply circuit 163) of the pixel power to be supplied to the display 160 (the panel 165 thereof) based on the OPR value. An example in which the processor 120 is configured to determine the OPR value and to control a source of the pixel power will be described below with reference to FIG. 4.

The memory 130 may include a volatile and/or nonvolatile memory. The memory 130 may store instructions or data associated with at least one other component(s) of the electronic device 101. According to various examples of the disclosure, the memory 130 may store software and/or a program 140.

For example, the memory 130 may store an image/video file including specific image data, an application program for displaying the specific image data on the panel 165, a program for a display driving method according to an example embodiment, and the like.

The program 140 may include, for example, a kernel 141, a middleware 143, an application programming interface (API) 145, and/or an application program (or an application) 147. At least a portion of the kernel 141, the middleware 143, or the API 145 may be referred to as an "operating system (OS)".

The kernel 141 may control or manage system resources (e.g., the bus 110, the processor 120, the memory 130, and the like) that are used to execute operations or functions of other programs (e.g., the middleware 143, the API 145, and the application program 147). Furthermore, the kernel 141 may provide an interface that allows the middleware 143, the API 145, or the application 147 to access discrete components of the electronic device 101 so as to control or manage system resources.

The middleware 143 may perform a mediation role such that the API 145 or the application 147 communicates with the kernel 141 to exchange data.

Furthermore, the middleware 143 may process task requests received from the application 147 based on priority. For example, the middleware 143 may assign the priority, which makes it possible to use a system resource (e.g., the bus 110, the processor 120, the memory 130, or the like) of the electronic device 101, to at least one of the application 147. For example, the middleware 143 may process the one or more task requests according to the priority assigned to the at least one, which makes it possible to perform scheduling or load balancing on the one or more task requests.

The API 145 may be an interface through which the application program 147 controls a function provided by the kernel 141 or the middleware 143, and may include, for example, at least one interface or function (e.g., an instruction) for a file control, a window control, image processing, a character control, or the like.

The application 147 may, for example, include a video player, an image viewer, or a game application (hereinafter referred to as "high-power application"), which provides various images by supplying a power to almost all pixels on the panel 165, and an application (hereinafter referred to as "low-power application"), which provides the following specific information with fewer pixels driven: watch, weather, date, temperature, news, notification, lock pattern, personal identification number (PIN) input screen, short message service (SMS) or instant messenger (IM) message, missed call indication, and the like. In other words, the application 147 may include the high-power application, which transmits image data having a great OPR value to the panel 165, and the low-power application, which transmits image data having a small OPR value to the panel 165.

The I/O interface 150 may transmit an instruction or data, input, for example, from a user or another external device, to other component(s) of the electronic device 101. Furthermore, the I/O interface 150 may output an instruction or data, received from other component(s) of the electronic device 101, to a user or another external device.

The display 160 may include the display driver integrated circuit 161 which provides the panel 165 with the pixel power and an image signal corresponding to image data received from the processor 120 (or the host), the pixel power supply circuit 163 which generates pixel power greater than the pixel power supplied from the display driver integrated circuit 161 and supplies the pixel power to the panel 165, and the panel which is supplied with an image signal and the pixel power and displays a screen that a user is able to visually perceive. A detailed functional configuration of the display 160 will be described below with reference to FIG. 2.

The display 160 may include, for example, a liquid crystal display (LCD), a light-emitting diode (LED) display, an organic LED (OLED) display, a microelectromechanical systems (MEMS) display, an electronic paper display, or the like. The display driver integrated circuit 161 or the pixel power supply circuit 163 according to various examples of the disclosure may control the supplying of the pixel power for a pixel. Accordingly, the display 160 according to various examples of the disclosure may correspond to an OLED display which controls the supplying of the pixel power for a pixel, that is, which includes a light source (e.g., OLED) every pixel. In this disclosure, the display 160 and the panel 165 may be described as being an OLED display and an OLED panel, respectively.

Furthermore, the display 160 (the panel 165 thereof) may display, for example, various contents (e.g., a text, an image, a video, an icon, a symbol, and the like) to a user by receiving the image signal and the pixel power and converting them into light. The display 160 may include a touch screen and may receive, for example, a touch, gesture, proximity, or hovering input using an electronic pen or a portion of a user's body.

The communication interface 170 may, for example, establish communication between the electronic device 101 and an external electronic device (e.g., a first external electronic device 102, a second external electronic device 104, or a server 106). For example, the communication interface 170 may be connected to a network 162 through wireless communication or wired communication to communicate with the external device (e.g., a second external electronic device 104 or a server 106).

The wireless communication may include at least one of, for example, LTE, LTE-A, CDMA, WCDMA, UMTs, WiBro, GSM, or the like, as cellular communication protocol. Furthermore, the wireless communication may include, for example, a local area network 164. The local area network 164 may include, for example, at least one of Wi-Fi, Bluetooth, near field communication (NFC), global positioning system (GPS), or the like. The wired communication may include at least one of, for example, a universal serial bus (USB), a high definition multimedia interface (HDMI), a recommended standard-132 (RS-132), or a plain old telephone service (POTS). The network 162 may include at least one of telecommunications networks, for example, a computer network (e.g., LAN or WAN), an internet, or a telephone network.

Each of the first and second external electronic devices 102 and 104 may be a device type that is different from or the same as that of the electronic device 101. According to an example of the disclosure, the server 106 may include a group of one or more servers. According to various examples of the disclosure, all or a part of operations that the electronic device 101 will perform may be executed by another or plural electronic devices (e.g., the electronic devices 102 and 104 and the server 106). According to an example of the disclosure, in the case where the electronic device 101 executes any function or service automatically or in response to a request, the electronic device 101 may not perform the function or the service internally, but, alternatively additionally, it may request at least a portion of a function associated with the electronic device 101 at other device (e.g., the electronic device 102 or 104 or the server 106). The other electronic device (e.g., the electronic device 102 or 104 or the server 106) may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
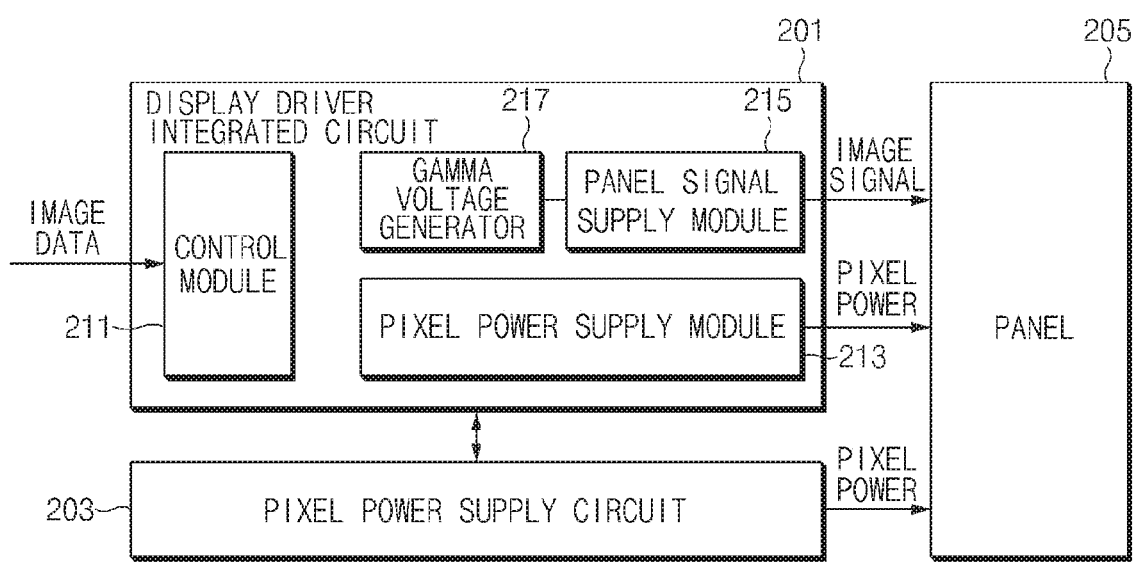
FIG. 2 is a diagram illustrating an example display.

FIG. 2 is a diagram illustrating an example display.

Referring to FIG. 2, a display (e.g., the display 160 of FIG. 1) according to an example of the disclosure may include a display driver integrated circuit 201 (corresponding to the display driver integrated circuit 161 of FIG. 1), a pixel power supplying circuit 203 (corresponding to the pixel power supply circuit 163 of FIG. 1), and a panel 205 (corresponding to the panel 165 of FIG. 1). The pixel power supplying circuit 203 may be referred to as a (external) pixel power supplying module, and the pixel power supply circuit 163 may be referred to as a (internal) pixel power supplying module.

The display driver integrated circuit 201 may include a control module 211, a pixel power supply circuitry or module 213, a panel signal supply circuitry or module 215, and a gamma voltage generator 217. Although not illustrated, the display driver integrated circuit 201 may further include other modules, which make it possible to function as a display driver integrated circuit, such as various interfaces, registers, an image processing module, a boost module, and the like. The display driver integrated circuit 201 may include such modules, thereby making it possible to supply the panel 205 with the pixel power and an image signal corresponding to image data from the processor 120 (or the host).

The control module (or controller) 211 may be configured to control the pixel power supply module 213 to supply the pixel power based on an OPR value of image data received from the processor 120 (or the host). The control module 211 may be configured to determine the OPR value of the image data received from the processor 120. In the case where the determined OPR value satisfies a predetermined condition, the control module 211 may be configured to control the pixel power supply module 213 to supply the pixel power to a pixel that receives the image signal. According to an example of the disclosure, in the case where an OPR value of image data satisfies the predetermined condition, the control module 211 may be configured to control the pixel power supplying circuit 203 to stop supplying the pixel power.

As such, the control module 211 may diversify a pixel power source which supplies the pixel power to a pixel that receives an image signal, based on an OPR value of image data. In the case where the OPR value is smaller than a specific value, the control module 211 may select the pixel power supply module 213, which consumes a relatively small quantity of battery power, as a pixel power resource and may interrupt the pixel power which is supplied from the pixel power supplying circuit 203 consuming a relatively great quantity of battery power.

According to an example of the disclosure, when an OPR value satisfies a predetermined condition, the control module 211 may be configured to change (e.g., decrease) the frame rate of an image signal that the panel signal supply module 215 supplies. For example, it may be assumed that an OPR value of image data is greater than a specific value and the frame rate of an image signal supplied to the panel 205 is 60 fps. In this case, when receiving image data having an OPR value smaller than a specific value, the control module 211 may lower the frame rate of an image signal to be supplied to the panel 205 from 60 fps to 30 fps. The reason is that a sudden change in a screen does not almost occur when an OPR value of image data is smaller than a specific value (i.e., when an application consuming a small quantity of power is executed).

Although not illustrated, the control module 211 may, for example, further include control logic, a timing controller module (T-con module), the frame rate (or a frame frequency) adjusting module, and the like.

Under the control of the control module 211, the pixel power supply module (or circuitry) 213 may supply power to a pixel, which receives an image signal, for a pixel. For example, the pixel power supply module 213 may supply power to an OLED included in each pixel of the panel 205.

If an OPR value is smaller than a specific value, the pixel power supply module 213 may supply pixel power to the panel 205 under the control of the control module 211. The pixel power supply module 213 may sufficiently supply power to all pixels on the panel 205 and elements implemented in the display driver integrated circuit 201. Furthermore, when an OPR value is smaller than the specific value, the control module 211 may interrupt pixel power that is supplied from the pixel power supplying circuit 203 consuming a relatively great quantity of power.

The panel signal supply module (or circuitry) 215 may supply an image signal corresponding to image data to the panel 205 based on a specific frame rate (per second). The image signal may be a signal which includes signals supplied to a scan line (not illustrated) and a data line (not illustrated), respectively. The panel signal supply module 215 may include a source driver and a gate driver, although not illustrated.

The gamma voltage generator 217 may generate a gamma voltage for gamma correction of the image signal.

The gamma correction may include correction of a difference between a photoelectric transformation characteristic of a device (e.g., a camera (not illustrated)) converting light into an image signal and a photoelectric transformation characteristic of a device (e.g., the panel 205) converting an image signal into light and correct non-linearity thereof. The gamma correction may, for example, be accomplished by setting (generating) a plurality of gamma voltages having constant voltage levels and applying the gamma voltages to an image signal. The gamma correction may allow each pixel of the panel 205, supplied with an image signal, to display an intended screen with a full color without distortion. For example, even though the pixel power supply module 213 having a relatively low output is used, the gamma correction may be performed with respect to each pixel supplied with pixel power when an OPR value is limited to be smaller than a specific value.

The pixel power supplying circuit 203 may generate pixel power greater than the pixel power supply module 213 of the display driver integrated circuit 201 and may supply the pixel power to a pixel of the panel 205. The pixel power supplying circuit 203 may include DC/DC-IC. The pixel power supplying circuit 203 may perform a function which corresponds to a function of the pixel power supply module 213 included in the display driver integrated circuit 201.

The pixel power supplying circuit 203 may, for example, be generally designed using the case where all pixels operate, that is, the case where an OPR value is 100%, as a standard. Accordingly, battery consumption of the pixel power supplying circuit 203 may be greater than that of the pixel power supply module 213 of the display driver integrated circuit 201. For this reason, the pixel power supplying circuit 203 may be used mostly when image data with a great OPR value is transmitted to a panel, that is, a high-power application is executed.

The panel 205 may be supplied with an image signal and pixel power and may display a screen corresponding to the image data. The panel 205 may include a plurality of pixels. Each of the plurality of pixels may include at least two or more switching elements (e.g., FET) and one OLED. Each pixel may receive the pixel power from the pixel power supply module 213 or the pixel power supplying circuit 203 and an image signal from the pixel signal supplying module 215 with a predetermined timing and may generate light.

Figure 3A:
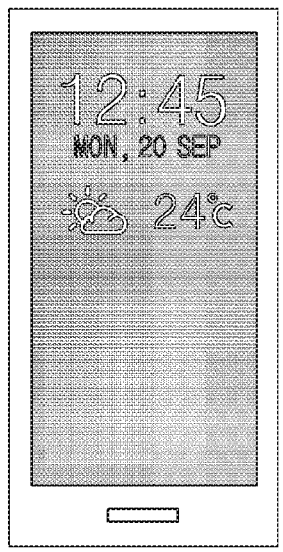
FIGS. 3A to 3C are diagrams illustrating panel screens of example electronic devices.
Figure 3B:
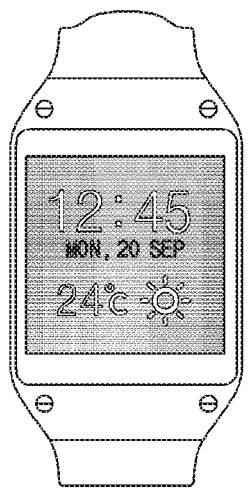
Figure 3C:
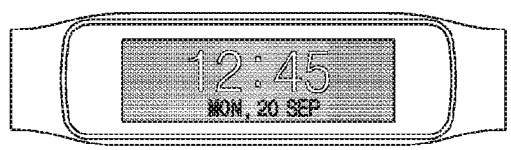

FIGS. 3A to 3C are diagrams illustrating example panel screens of an electronic device.

Illustrated in FIG. 3A to 3C are various screens displayed on a panel of an electronic device in the case where an OPR value of image data is smaller than a specific value. In FIG. 3A, a low-power application capable of providing watch, date, weather, and temperature information may be driven on a smartphone. Referring to FIG. 3A, pixel power may be supplied to pixels used to compose characters and figures indicating watch, date, weather, and temperature information, and no power may be supplied to remaining pixels (black pixels). For such a screen, a ratio (an OPR value) of pixels composing a character(s) or a figure(s) to all pixels on the panel of the smart phone may be lower than a specific value (e.g., 10%). In this case, the control module 211 may be configured to control the pixel power supply module 213, which consumes a relatively small quantity of power, to supply pixel power to pixels composing a character(s) or a figure(s).

In FIG. 3B, a low-power application capable of providing watch, date, weather, and temperature information may be driven on a smart watch. In FIG. 3C, a low-power application capable of providing watch, date, weather, and temperature information may be driven on a smart band. A description about FIGS. 3B and 3C may correspond to that given with reference to FIG. 3A and may be thus omitted. As described above, an electronic device according to various examples of the disclosure may not be limited to a smart phone and a wearable device. For example, the electronic device according to various examples of the disclosure may be applied to all electronic devices each including a display, such as a television, a smart appliance, and the like.

Figure 4:
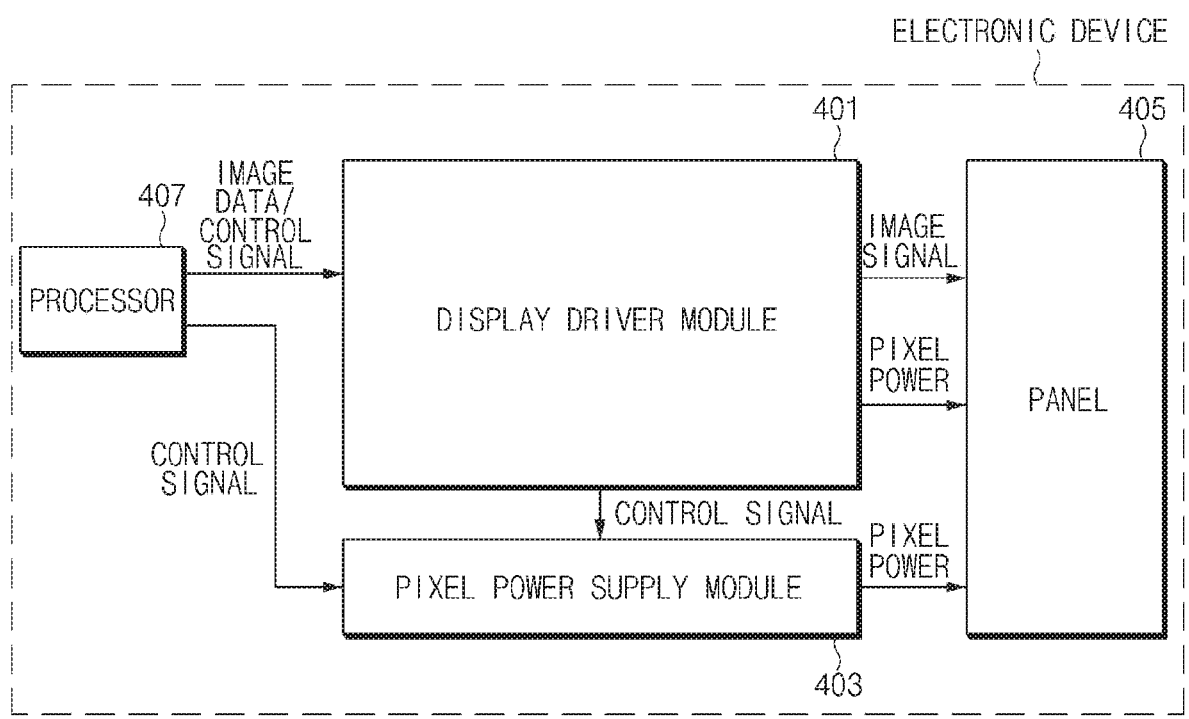
FIG. 4 is a block diagram illustrating an example electronic device including a display driver integrated circuit.

FIG. 4 is a block diagram illustrating an example electronic device including a display driver integrated circuit.

Referring to FIG. 4, an electronic device according to another example of the disclosure may include a display driver module (or circuit) 401, a pixel power supplying module (or circuit) 403, a panel 405, and a processor 407.

The display driver module 401 may be different from the display driver integrated circuit 201 in that the display driver module 401 is controlled by the processor 407. Similarly to the display driver integrated circuit 201, the display driver integrated circuit 401 may include the pixel power supply module 213, the panel signal supply module 215, and the gamma voltage generator 217.

According to the above description, the display driver module 401 may supply an image signal corresponding to image data to the panel 405 and may supply pixel power to a pixel supplied with the image signal under control of the processor 407. The display driver module 401 may include the gamma voltage generator 217. Accordingly, when an OPR value satisfies a predetermined condition, the display driver module 401 may perform gamma correction about an image signal and may supply the gamma-corrected image signal to the panel 405.

The pixel power supply module 403 may supply pixel power to a pixel supplied with an image signal under the control of the processor 407. A configuration and a function of the pixel power supply module 403 may correspond to the pixel power supplying circuit 203 of FIG. 2, but it may be different from the pixel power supplying circuit 203 in that the pixel power supply module 403 is under control of the processor 407.

The panel 405 may include a plurality of pixels and may display a screen corresponding to image data. The panel 405 may correspond to the panel 205 of FIG. 2, and a description thereof may be thus omitted.

The processor 407 (corresponding to the processor 120 of FIG. 1) may be configured to generate image data by execution of an application and may be configured to send the image data to the display driver module 401. Meanwhile, the processor 407 may be configured to determine an OPR value of the image data thus generated and may be configured to control a source of pixel power to be supplied to the panel 405 based on the OPR value.

According to an example of the disclosure, when an OPR value satisfies a predetermined condition (e.g., in the case where an OPR value is smaller than a specific value), the processor 407 may be configured to control the display driver module 401 to supply pixel power. In the case where the OPR value satisfies the predetermined condition, the processor 407 may be configured to control the pixel power supply module 403 to stop supplying the pixel power.

When the OPR value satisfies another predetermined condition (e.g., in the case where the OPR value is greater than the specific value), the processor 407 may be configured to control the pixel power supply module 403 to supply the pixel power and may be configured to control the display driver module 401 to stop supplying the pixel power. Accordingly, the processor 407 may diversify a pixel power source, supplying the pixel power to a pixel, based on the OPR value.

According to an example of the disclosure, when the OPR value satisfies another predetermined condition (e.g., in the case where the OPR value is smaller than the specific value), the processor 407 may be configured to change (e.g., lower) the frame rate of an image signal that the display driver module 401 supplies.

Figure 5:
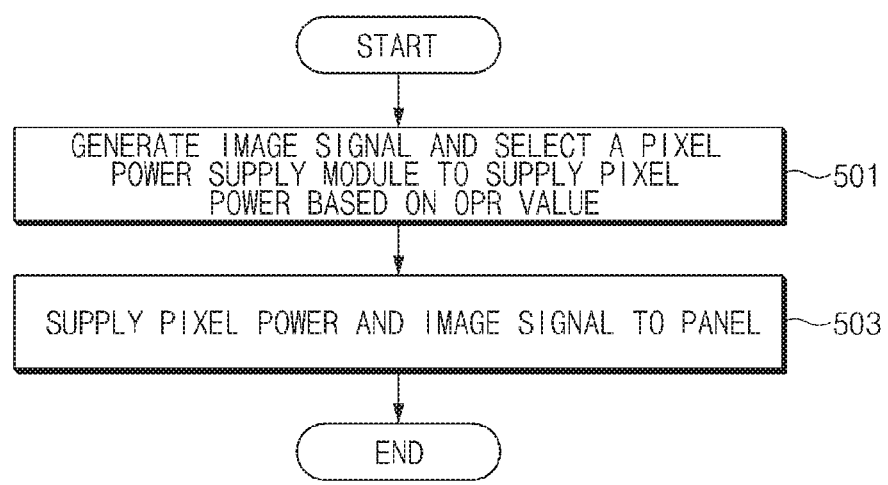
FIG. 5 is a flow chart illustrating an example display driving method.

FIG. 5 is a flow chart illustrating an example display driving method.

Referring to FIG. 5, a display driving method according to various examples of the disclosure may include generating an image signal corresponding to image data by a display driver integrated circuit 201 (or a display driver module 401 of FIG. 4) and selecting a pixel power supply module, which supplies pixel power to a panel 205 (or a panel 405 of FIG. 4), from among a plurality of pixel power supply modules based on an OPR value of the image data determined by a control module 211 of the display driver integrated circuit 201 (operation 501), and supplying the image signal and pixel power from the selected pixel power supply module to the panel (operation 503).

According to various examples of the disclosure, the plurality of pixel power supply modules may include a first pixel power supply module generating a pixel power of a first level and a second pixel power supply module generating a pixel power of a second level greater than the first level. The first pixel power supply module may be, for example, the pixel power supply module 213 of FIG. 2, and the second pixel power supply module may be, for example, the pixel power supplying circuit 203 of FIG. 2 or the pixel power supply module 403 of FIG. 4.

Figure 6:
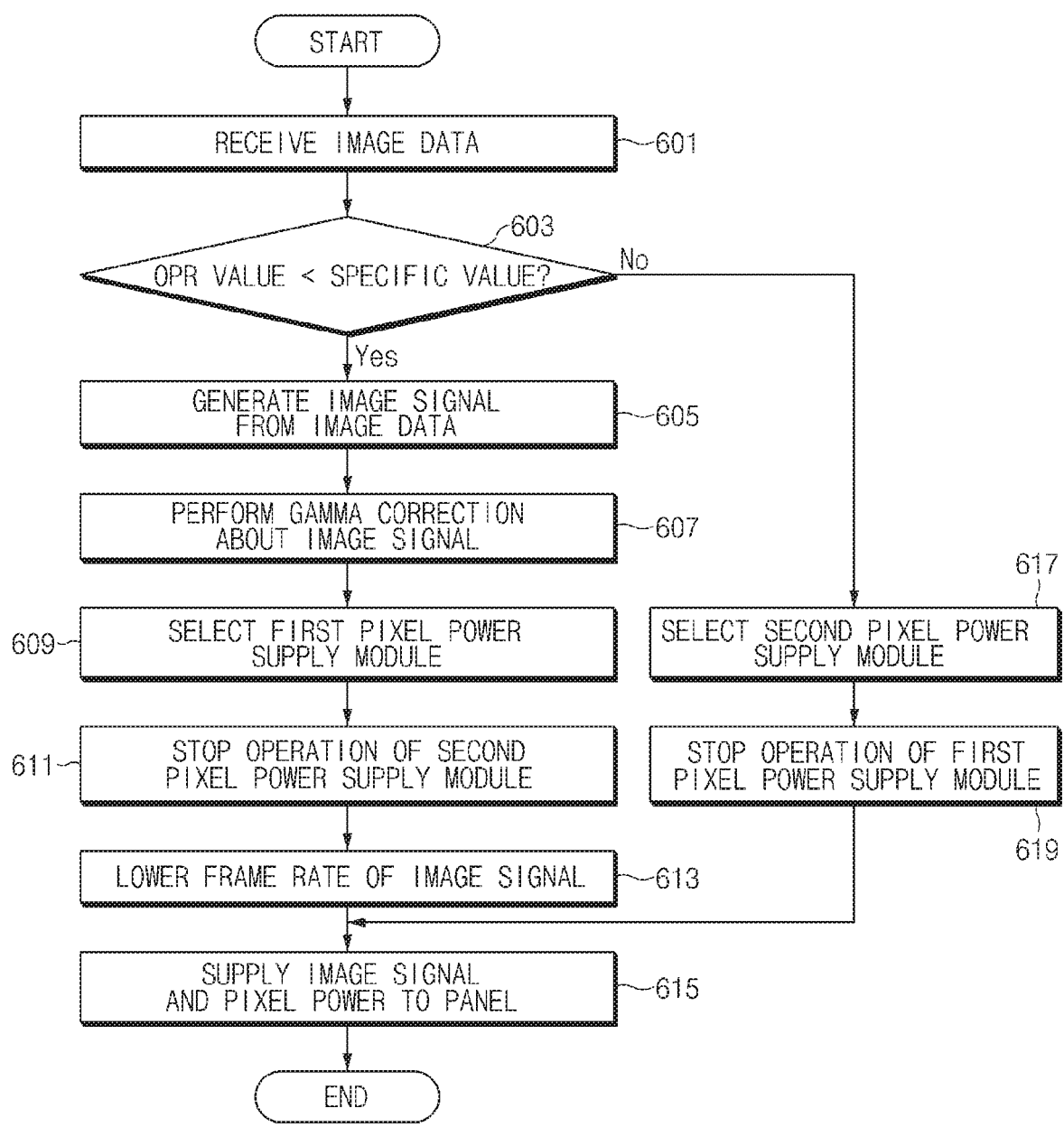
FIG. 6 is a flow chart illustrating an example display driving method.

FIG. 6 is a flow chart illustrating an example display driving method.

Referring to FIG. 6, in operation 601, the display driver integrated circuit 201 may receive image data, generated according to execution of the application 147, from the processor 120. When the application 147 is executed, the processor 120 may generate image data having an OPR value and may transmit the image data to the display driver integrated circuit 201 of FIG. 2.

According to another example of the disclosure, in operation 601, the display driver module 401 of FIG. 4 may receive image data, generated according to execution of the application 147, from the processor 407 of FIG. 4. When the application 147 is executed, the processor 407 may generate image data with an OPR value and may transmit the image data to the display driver module 401.

In operation 603, for example, the display driver integrated circuit 201 (the control module 211 thereof) of FIG. 2 may be configured to determine an OPR value of the received image data and may compare the OPR value thus determined with a specific value. If the OPR value is smaller than the specific value, the method proceeds to operation 605; if not, the method proceeds to operation 617. For example, in the case where an application participating in generating the image data is a low-power application for displaying watch, calendar, and weather information, the method proceeds to operation 605 because the OPR value is smaller than the specific value.

According to another example of the disclosure, in operation 603, the processor 407 of FIG. 4 may be configured to determine an OPR value of the received image data and may compare the OPR value thus determined with a specific value. If the OPR value is smaller than the specific value, the method proceeds to operation 605; if not, the method proceeds to operation 617.

In operation 605, the panel signal supply module 215 of the display driver integrated circuit 201 illustrated in FIG. 2 may generate an image signal corresponding to the received image data. As described above, the image signal may include signals to be supplied to a scan line and a data line.

According to still another example of the disclosure, in operation 605, the display driver module 401 of FIG. 4 may generate an image signal corresponding to the received image data.

In operation 607, the display driver integrated circuit 201 (the gamma voltage generator 217 thereof) of FIG. 2 may perform gamma correction for the image signal. Likewise, according to another example of the disclosure, the display driver module 401 of FIG. 4 may perform gamma correction for the image signal.

In operations 609 and 611, since the OPR value of the image data is smaller than the specific value, the display driver integrated circuit 201 (the control module 211 thereof) of FIG. 2 may be configured to select the pixel power supply module 213 (a first pixel power supply module) of the display driver integrated circuit 201 as a pixel power supply module which supplies a pixel power. Furthermore, the display driver integrated circuit 201 (the control module 211 thereof) may control the pixel power supplying circuit 203 (a second pixel power supply module) to stop supplying pixel power.

According to another example of the disclosure, in operations 609 and 611, since the OPR value of the image data is smaller than the specific value, the processor 407 of FIG. 4 may be configured to select the display driver module 401 (a first pixel power supply module) as a pixel power supply module which supplies a pixel power. Furthermore, the processor 407 may be configured to control the pixel power supply module 403 (a second pixel power supply module) to stop supplying pixel power.

In operation 613, for example, the display driver integrated circuit 201 (the control module 211 thereof) of FIG. 2 may be configured to control the panel signal supply module 215 to supply an image signal with a lowered frame rate. According to another example of the disclosure, the processor 407 of FIG. 4 may be configured to control the display driver module 401 to supply an image signal with a lowered frame rate.

In operation 615, for example, the panel 205 of FIG. 2 may be supplied with the image signal from the display driver integrated circuit 201 and may be supplied with pixel power from the pixel power supply module 213 or the pixel power supplying circuit 203.

According to another example of the disclosure, in operation 615, the panel 405 of FIG. 4 may be supplied with the image signal from the display driver module 401 and may be supplied with a pixel power from the display driver module 401 or the pixel power supply module 403.

In operations 617 and 619, since the OPR value of the image data is not smaller than the specific value, the display driver integrated circuit 201 (the control module 211 thereof) of FIG. 2 may select the pixel power supplying circuit 203 (a second pixel power supply module) as a pixel power supply module which supplies a pixel power. Furthermore, the display driver integrated circuit 201 (the control module 211 thereof) may control the pixel power supply module 213 (a first pixel power supply module) of the display driver integrated circuit 201 to stop supplying pixel power.

According to another example of the disclosure, in operations 609 and 611, since the OPR value of the image data is not smaller than the specific value, the processor 407 of FIG. 4 may select the pixel power supply module 403 (a second pixel power supply module) as a pixel power supply module which supplies a pixel power. Furthermore, the processor 407 may be configured to control the display driver module 401 (a first pixel power supply module) to stop supplying a pixel power.

Various examples of the disclosure are exemplified as operations 617 and 619 are performed in the case where the OPR value is determined in operation 603 as being not smaller than the specific value. However, the scope and spirit of the disclosure may not be limited thereto. For example, like the case where the OPR value is smaller than the specific value, an image signal may be generated from image data and gamma correction may be performed. The case where the OPR value is not smaller than the specific value may be the case where power is supplied to almost all pixels to provide colorful images, that is, a high-power application is executed. In this case, the panel signal supply module 215 of the display driver integrated circuit 201 or the display driver module 401 may not decrease the frame rate of an image signal to be supplied.

In a display driving method, a display driver integrated circuit, and an electronic device including the same according to various examples of the disclosure, a pixel power source may be selected based on an OPR value of image data. If the OPR value is smaller than a specific value, it may be possible to perform control such that an operation of a pixel power supplying circuit consuming a relatively great quantity of battery power is stopped and a display driver integrated circuit supplies pixel power.

According to an example of the disclosure, in the case where an OPR value is smaller than a specific value, a display driver integrated circuit may supply pixel power to pixels of which the number is relatively small, and thus, gamma correction for implementation of a full color may be used even though a pixel power capable of being supplied is somewhat limited.

According to an example of the disclosure, if an OPR value of image data is smaller than a specific value, in general, the probability that a sudden change in a screen is small may be high. Accordingly, the frame rate of an image signal which a display driver integrated circuit supplies may be decreased if the OPR value is small, thereby reducing power consumption more and more.

In addition, an electronic device where a display driving method according to various examples of the disclosure is performed or which includes a display driver integrated circuit according to various examples of the disclosure may be a wearable device. However, it may be possible to make the best use of a smart watch as a representative wearable device when a watch image is being outputted.

However, in the case of displaying a watch, a date, and the like, a general smart watch equipped with a display may display a watch and the like during a specific time and may enter a sleep mode, in which anything is not displayed, to reduce power consumption. According to various examples of the disclosure, since battery consumption of a wearable device is minimized and/or reduced, it may be possible to implement a function (so-called "always-on function") which enables a watch, a date, and the like to be displayed always on a display panel.

Figure 7:
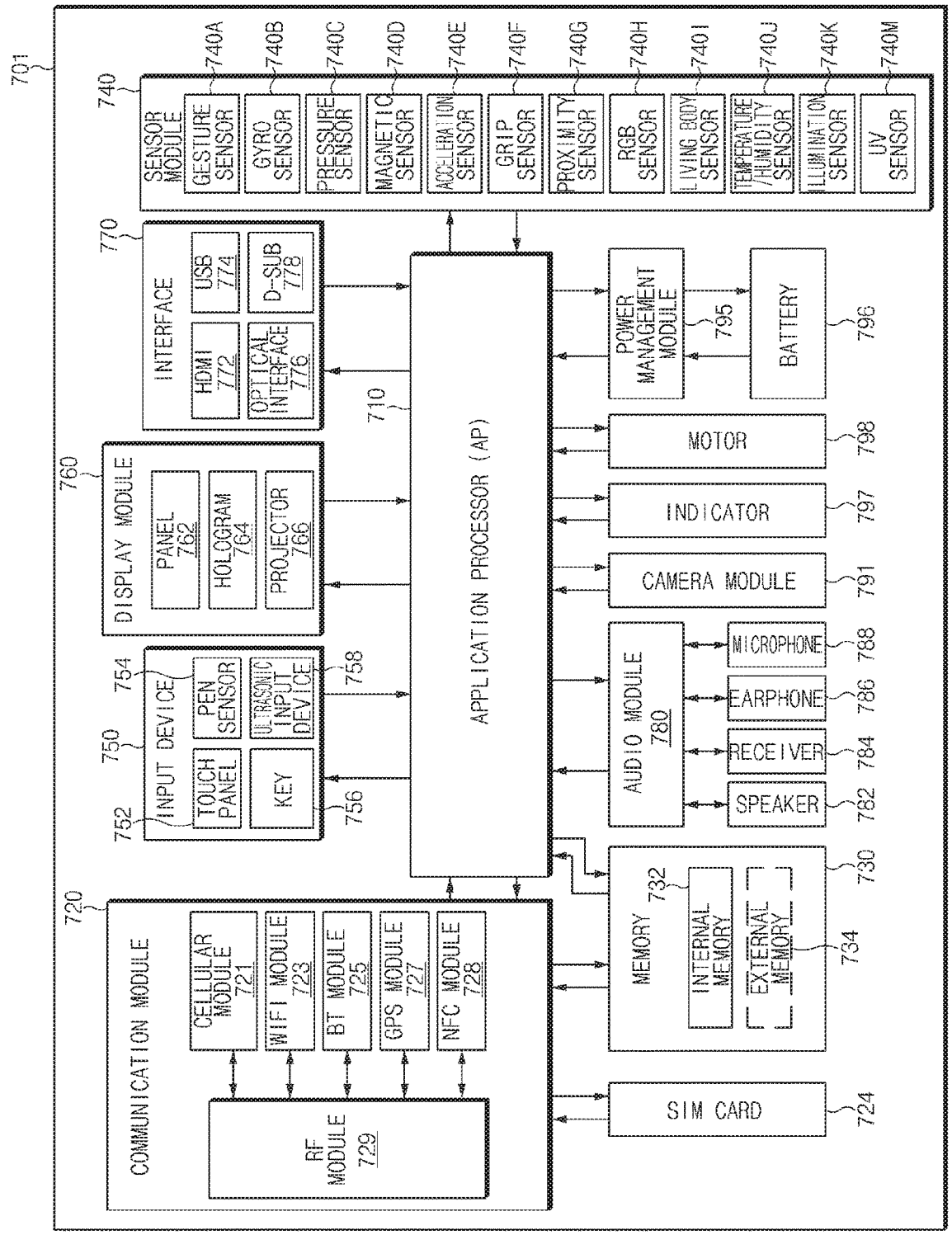
FIG. 7 is a block diagram illustrating an example electronic device.

FIG. 7 is a block diagram illustrating an example electronic device 701.

Referring to FIG. 7, an electronic device 701 may include, for example, all or a part of an electronic device 101 illustrated in FIG. 1. The electronic device 701 may include one or more processors (e.g., an AP, a graphics processor, and the like) 710, a communication module 720 including communication circuitry, a subscriber identification module 724, a memory 730, a sensor module 740 including at least one sensor, an input device 750, a display 760 (e.g., the display 160), an interface 770, an audio module 780, a camera module 791, a power management module 795, a battery 796, an indicator 797, and a motor 798.

The processor 710 may drive an operating system (OS) or an application to control a plurality of hardware or software components connected to the processor 710 and may process and compute a variety of data. The processor 710 may, for example, be implemented with a System on Chip (SoC), for example. According to an example of the disclosure, the processor 710 may further include a graphic processing unit (GPU) and/or an image signal processor. The processor 710 may include at least a part (e.g., a cellular module 721) of components illustrated in FIG. 7. The processor 710 may load and process an instruction or data, which is received from at least one of other components (e.g., a nonvolatile memory), and may store a variety of data at a nonvolatile memory.

The communication module 720 may be configured the same as or similar to a communication interface 170 of FIG. 1. The communication module 720 may include a cellular module 721, a wireless-fidelity (Wi-Fi) module 723, a Bluetooth (BT) module 725, a global positioning system (GPS) module 727, a near field communication (NFC) module 728, and a radio frequency (RF) module 729.

The cellular module 721 may provide voice communication, video communication, a character service, an Internet service or the like through a communication network. According to an example of the disclosure, the cellular module 721 may perform discrimination and authentication of an electronic device 701 within a communication network using a subscriber identification module 724 (e.g., a SIM card), for example. According to an example of the disclosure, the cellular module 721 may perform at least a portion of functions that the processor 710 provides. According to an example of the disclosure, the cellular module 721 may include a communication processor (CP) (not shown).

Each of the Wi-Fi module 723, the BT module 725, the GPS module 727, and the NFC module 728 may include a processor configured to process data exchanged through a corresponding module, for example. According to an example of the disclosure, at least a portion (e.g., two or more components) of the cellular module 721, the Wi-Fi module 723, the BT module 725, the GPS module 727, and the NFC module 728 may be included within one Integrated Circuit (IC) or an IC package.

The RF module 729 may transmit and receive a communication signal (e.g., an RF signal). The RF module 729 may include a transceiver, a power amplifier module (PAM), a frequency filter, a low noise amplifier (LNA), an antenna, or the like. According to various examples of the disclosure, at least one of the cellular module 721, the Wi-Fi module 723, the BT module 725, the GPS module 727, or the NFC module 728 may transmit and receive an RF signal through a separate RF module.

The subscriber identification module 724 may include, for example, a subscriber identification module and may include unique identify information (e.g., integrated circuit card identifier (ICCID)) or subscriber information (e.g., integrated mobile subscriber identity (IMSI)).

The memory 730 (e.g., the memory 130) may include an internal memory (or embedded memory) 732 or an external memory 734. For example, the internal memory 732 may include at least one of a volatile memory (e.g., a dynamic random access memory (DRAM), a static RAM (SRAM), or a synchronous DRAM (SDRAM)), a nonvolatile memory (e.g., a one-time programmable read only memory (OT-PROM), a programmable ROM (PROM), an erasable and programmable ROM (EPROM), an electrically erasable and programmable ROM (EEPROM), a mask ROM, a flash ROM, a NAND flash memory, or a NOR flash memory), a hard drive, or a solid state drive (SSD).

The external memory 734 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 734 may be functionally and/or physically connected to the electronic device 701 through various interfaces.

The sensor module 740 may measure, for example, a physical quantity or may detect an operation state of the electronic device 701. The sensor module 740 may convert the measured or detected information to an electric signal. The sensor module 740 may include at least one of a gesture sensor 740A, a gyro sensor 740B, a pressure sensor 740C, a magnetic sensor 740D, an acceleration sensor 740E, a grip sensor 740F, a proximity sensor 740G, a color sensor 740H (e.g., red, green, blue (RGB) sensor), a living body sensor 740I, a temperature/humidity sensor 740J, an illuminance sensor 740K, or an UV sensor 740M. Although not illustrated, additionally or generally, the sensor module 740 may further include, for example, an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, and/or a fingerprint sensor. The sensor module 740 may further include a control circuit configured to control at least one or more sensors included therein. According to an example of the disclosure, the electronic device 701 may further include a processor which is a part of the processor 710 or independent of the processor 710 and is configured to control the sensor module 740. The processor may be configured to control the sensor module 740 while the processor 710 remains at a sleep state.

The input device 750 may include, for example, a touch panel 752, a (digital) pen sensor 754, a key 756, an ultrasonic input unit 758, or the like. The touch panel 752 may, for example, use at least one of capacitive, resistive, infrared and ultrasonic detecting methods. Also, the touch panel 752 may, for example, further include a control circuit. The touch panel 752 may, for example, further include a tactile layer to provide a tactile reaction to a user.

The (digital) pen sensor 754 may be, for example, a part of a touch panel or may include an additional sheet for recognition. The key 756 may include, for example, a physical button, an optical key, a keypad, and the like. The ultrasonic input device 758 may detect (or sense) an ultrasonic signal, which is generated from an input device, through a microphone (e.g., a microphone 788) and may check data corresponding to the detected ultrasonic signal.

The display 760 (e.g., the display 160) may include a panel 762 (e.g., the panel 165), a hologram device 764, and/or a projector 766. The display 760 may further include the display driver integrated circuit 161 and the pixel power supply circuit 163 as illustrated in FIG. 1.

The panel 762 may be configured to be the same as or similar to the panel 165 of the display 160 of FIG. 1. The panel 762 and the touch panel 752 may be integrated into a single module. The hologram device 764 may display a stereoscopic image in a space using a light interference phenomenon. The projector 766 may project light onto a screen so as to display an image. The screen may be arranged in the inside or the outside of the electronic device 701. According to an example of the disclosure, the display 760 may further include a control circuit configured to control the panel 762, the hologram device 764, and/or the projector 766.

The interface 770 may include, for example, an HDMI (high-definition multimedia interface) 772, a USB (universal serial bus) 774, an optical interface 776, or a D-sub (D-sub-miniature) 778. The interface 770 may be included, for example, in a communication interface 170 illustrated in FIG. 1. Additionally or generally, the interface 770 may include, for example, a mobile high definition link (MHL) interface, a SD card/multi-media card (MMC) interface, or an infrared data association (IrDA) standard interface.

The audio module 780 may convert a sound and an electric signal in dual directions. At least a portion of the audio module 780 may be included, for example, in an input/output interface 150 illustrated in FIG. 1. The audio module 780 may process, for example, sound information that is input or output through a speaker 782, a receiver 784, an earphone 786, or a microphone 788.

The camera module 791 for shooting a still image or a video may include, for example, at least one image sensor (e.g., a front sensor or a rear sensor), a lens, an image signal processor (ISP), or a flash (e.g., an LED or a xenon lamp).

The power management module 795 may manage, for example, power of the electronic device 701. According to an example of the disclosure, a power management integrated circuit (PMIC) a charger IC, or a battery or fuel gauge may be included in the power management module 795. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 796 and a voltage, current or temperature thereof while the battery is charged. The battery 796 may include, for example, a rechargeable battery or a solar battery.

The indicator 797 may display a specific state of the electronic device 701 or a portion thereof (e.g., a processor 710), such as a booting state, a message state, a charging state, and the like. The motor 798 may convert an electrical signal into a mechanical vibration and may generate the following effects: vibration, haptic, and the like. Although not illustrated, a processing device (e.g., a GPU) for supporting a mobile TV may be included in the electronic device 701. The processing device for supporting a mobile TV may process media data according to the standards of DMB, digital video broadcasting (DVB), MediaFlo™, or the like.

Each of the above-mentioned elements of the electronic device according to various examples of the disclosure may be configured with one or more components, and the names of the elements may be changed according to the type of the electronic device. The electronic device according to various examples of the disclosure may include at least one of the above-mentioned elements, and some elements may be omitted or other additional elements may be added. Furthermore, some of the elements of the electronic device according to various examples of the disclosure may be combined with each other so as to form one entity, so that the functions of the elements may be performed in the same manner as before the combination.

Figure 8:
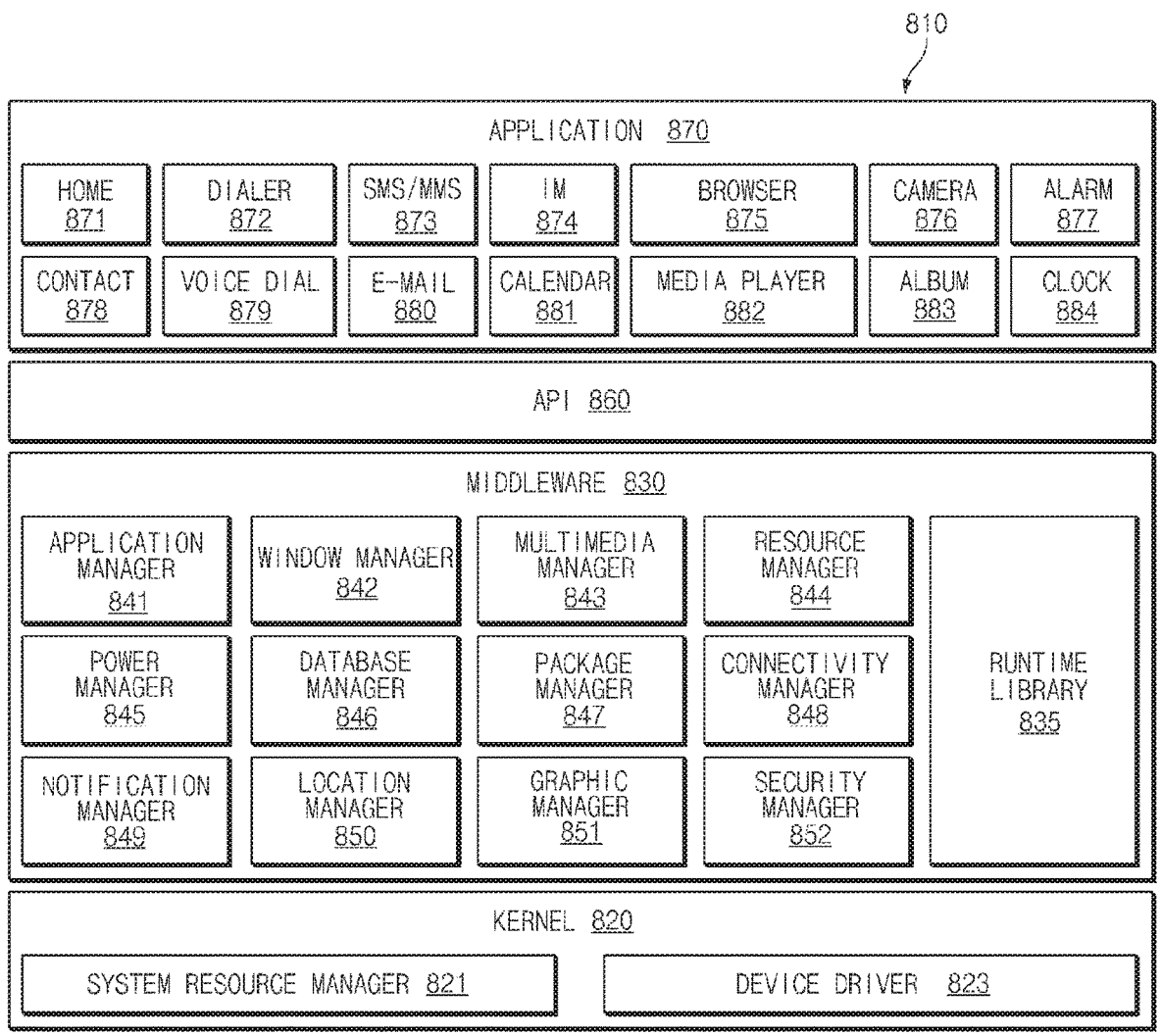
FIG. 8 is a block diagram illustrating an example program module.

FIG. 8 is a block diagram illustrating an example program module 810.

Referring to FIG. 8, according to an example of the disclosure, a program module 810 (e.g., the program 140) may include an operating system (OS) to control resources associated with an electronic device (e.g., the electronic device 101), and/or diverse applications (e.g., the application program 147) driven on the OS. The OS may be, for example, android, iOS, windows, symbian, tizen, or bada.

The program module 810 may include a kernel 820, a middleware 830, an application programming interface (API) 860, and/or an application 870. At least a part of the program module 810 may be preloaded on an electronic device or may be downloadable from an external electronic device (e.g., the electronic devices 102 and 104, the server 106, and the like).

The kernel 820 (e.g., the kernel 141) may include, for example, a system resource manager 821 or a device driver 823. The system resource manager 821 may perform control, allocation, or retrieval of system resources. According to an example of the disclosure, the system resource manager 821 may include a process managing part, a memory managing part, or a file system managing part. The device driver 823 may include, for example, a display driver, a camera driver, a Bluetooth driver, a common memory driver, an USB driver, a keypad driver, a Wi-Fi driver, an audio driver, or an inter-process communication (IPC) driver.

The middleware 830 may provide, for example, a function which the application 870 needs in common, or may provide diverse functions to the application 870 through the API 860 to allow the application 870 to efficiently use limited system resources of the electronic device. According to an example of the disclosure, the middleware 830 (e.g., the middleware 143) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, or a security manager 852.

The runtime library 835 may include, for example, a library module which is used by a compiler to add a new function through a programming language while the application 870 is being executed. The runtime library 835 may perform input/output management, memory management, or capacities about arithmetic functions.

The application manager 841 may manage, for example, a life cycle of at least one application of the application 870. The window manager 842 may manage a GUI resource which is used in a screen. The multimedia manager 843 may identify a format necessary for playing diverse media files, and may perform encoding or decoding of media files by using a codec suitable for the format. The resource manager 844 may manage resources such as a storage space, memory, or source code of at least one application of the application 870.

The power manager 845 may operate, for example, with a basic input/output system (BIOS) to manage a battery or power, and may provide power information for an operation of an electronic device. The database manager 846 may generate, search for, or modify database which is to be used in at least one application of the application 870. The package manager 847 may install or update an application which is distributed in the form of package file.

The connectivity manager 848 may manage, for example, wireless connection such as Wi-Fi or Bluetooth. The notification manager 849 may display or notify an event such as arrival message, promise, or proximity notification in a mode that does not disturb a user. The location manager 850 may manage location information of an electronic device. The graphic manager 851 may manage a graphic effect that is provided to a user, or manage a user interface relevant thereto. The security manager 852 may provide a general security function necessary for system security or user authentication. According to an example of the disclosure, in the case where an electronic device (e.g., the electronic device 101) includes a telephony function, the middleware 830 may further include a telephony manager for managing a voice or video call function of the electronic device.

The middleware 830 may include a middleware module that combines diverse functions of the above-described components. The middleware 830 may provide a module specialized to each OS kind to provide differentiated functions. Additionally, the middleware 830 may remove a part of the preexisting components, dynamically, or may add a new component thereto.

The API 860 (e.g., the API 145) may be, for example, a set of programming functions and may be provided with a configuration which is variable depending on an OS. For example, in the case where an OS is the android or the iOS, it may be permissible to provide one API set per platform. In the case where an OS is the tizen, it may be permissible to provide two or more API sets per platform.

The application 870 (e.g., an application program 147) may include, for example, one or more applications capable of providing functions for a home 871, a dialer 872, an SMS/MMS 873, an instant message (IM) 874, a browser 875, a camera 876, an alarm 877, a contact 878, a voice dial 879, an e-mail 880, a calendar 881, a media player 882, am album 883, and a timepiece 884, or for offering health care (e.g., measuring an exercise quantity or blood sugar) or environment information (e.g., atmospheric pressure, humidity, or temperature).

According to an example of the disclosure, the application 870 may include an application (hereinafter referred to as "information exchanging application" for descriptive convenience) to support information exchange between the electronic device (e.g., the electronic device 101) and an external electronic device (e.g., an electronic device 102 or 104). The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., the electronic device 102 or 104). Additionally, the information exchanging application may receive, for example, notification information from an external electronic device and provide the notification information to a user.

The device management application may be configured to manage (e.g., install, delete, or update), for example, at least one function (e.g., turn-on/turn-off of an external electronic device itself (or a part of components) or adjustment of brightness (or resolution) of a display) of the external electronic device (e.g., the electronic device 102 or 104) which communicates with the electronic device, an application running in the external electronic device, or a service (e.g., a call service or a message service) provided from the external electronic device.

According to an example of the disclosure, the application 870 may include an application (e.g., a health care application) which is assigned in accordance with an attribute (e.g., an attribute of a mobile medical device as a kind of electronic device) of the external electronic device (e.g., the electronic device 102 or 104). According to an example of the disclosure, the application 870 may include an application which is received from an external electronic device (e.g., the server 106 or the electronic device 102 or 104). According to an example of the disclosure, the application 870 may include a preloaded application or a third party application which is downloadable from a server. The component titles of the program module 810 according to the example of the disclosure may be modifiable depending on kinds of OSs.

According to various examples of the disclosure, at least a portion of the program module 810 may be implemented by software, firmware, hardware, or a combination of two or more thereof. At least a portion of the program module 810 may be implemented (e.g., executed), for example, by a processor (e.g., the application processor 710). At least a portion of the program module 810 may include, for example, modules, programs, routines, sets of instructions, or processes, or the like for performing one or more functions.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various examples of the disclosure may include at least one of an application-specific IC (ASIC) chip, a field-programmable gate array (FPGA), and a programmable-logic device for performing some operations, which are known or will be developed.

According to various examples of the disclosure, at least a portion of an apparatus (e.g., modules or functions thereof) or a method (e.g., operations) according to various examples of the disclosure, for example, may be implemented by instructions stored in a computer-readable storage media in the form of a program module. The instruction, when executed by one or more processors (e.g., the processor 120), may perform a function corresponding to the instruction. The computer-readable storage media, for example, may be the memory 130.

A computer-readable recording media may include a hard disk, a floppy disk, a magnetic media (e.g., a magnetic tape), an optical media (e.g., compact disc read only memory (CD-ROM) and a digital versatile disc (DVD, a magneto-optical media (e.g., a floptical disk), and a hardware device (e.g., read only memory (ROM), random access memory (RAM), a flash memory, or the like). Also, a program instruction may include not only a mechanical code such as things generated by a compiler but also a high-level language code executable on a computer using an interpreter. The above hardware unit may be configured to operate via one or more software modules for performing an operation of the disclosure, and vice versa.

A module or a program module according to an example of the disclosure may include at least one of the above elements, or a portion of the above elements may be omitted, or additional other elements may be further included. Operations performed by a module, a program module, or other elements according to an example of the disclosure may be executed sequentially, in parallel, repeatedly, or in a heuristic method. Also, a portion of operations may be executed in different sequences, omitted, or other operations may be added.

According to various examples of the disclosure, a pixel power resource may be selected based on an OPR value of image data, and a frame rate of an image signal may be lowered. Thus, power consumption may be reduced. This low-power scheme may make it possible to implement a function (so-called "always-on function") in which a specific screen is always displayed on a display panel.

While the disclosure has been shown and described with reference to various examples thereof, it will be understood by those skilled in the art that various changes in form and details may be made therein without departing from the spirit and scope of the disclosure as defined by the appended claims and their equivalents.

What is claimed is:

1. A display module comprising:
   a display panel; and
   a display driver circuit configured to supply signals corresponding to image data to pixels included in the display panel, of an electronic device for displaying a screen based on image data, and to supply power to the pixels,
   wherein, according to operation of a low-power application for displaying the screen with a low on pixel ratio (OPR) value less than a predetermined value, the display driver circuit is configured to provide signals corresponding to image data of a screen with the low OPR value to pixels included in the display panel at a reduced frequency rate, and supply power to the pixels,
   the reduced frequency rate being at a rate lower than a normal mode rate.

2. The display module of claim 1, wherein the display module is configured so that power supply from a pixel power supply circuit included in the electronic device to the panel is stopped based on the low OPR value.

3. The display module of claim 2, wherein the display driver circuit is configured to change the frequency rate of the signals when the OPR value is less than the predetermined value.

4. The display module of claim 1, wherein the normal mode rate is 60 fps.

5. An electronic device comprising:
   a processor;
   a panel configured to display a screen based on image data;
   a display driver circuit configured to supply signals corresponding to image data to pixels included in the panel, and supply power to the pixels; and
   a pixel power supply circuit configured to supply power to the pixels;
   wherein, according to operation of a low-power application for displaying a screen with a low on pixel ratio (OPR) value less than a predetermined value, the electronic device is configured so that:
   the display driver circuit provides signals corresponding to image data of the screen with the low OPR value to pixels included in the panel, and supplies power to the pixels, and
   the display driver circuit drives the panel with a reduced frame rate of the signals, wherein the reduced frame rate is lower than a normal mode frame rate,
   wherein the OPR value is a ratio of pixels of the panel which are switched on to all pixels included in the panel.

6. The electronic device of claim 5, wherein the processor is configured to control the pixel power supply circuit to stop supplying the power when the OPR is less than the predetermined value.

7. The electronic device of claim 5, wherein the processor is configured to control the display driver circuit to change a frame rate of the image signal when the OPR value satisfies a predetermined condition.

8. The electronic device of claim 7, the processor is configured to control the display driver circuit to lower the frame rate of the signals when the OPR value satisfies the predetermined condition.

9. The electronic device of claim 5, wherein the display driver circuit is configured to perform gamma correction for the signals and supply the gamma-corrected signals to the panel based on the OPR being less than the predetermined value.

10. The electronic device of claim 5, wherein the processor is configured to control the pixel power supply circuit to supply the power while the electronic device is in the normal mode.

11. The electronic device of claim 10, wherein the processor is configured to control the display driver circuit to stop supplying the power.

12. The electronic device of claim 5, wherein the normal mode frame rate is 60 fps.

13. A method for controlling an electronic device, comprising:
providing signals corresponding to image data to pixels included in a panel;
controlling a display driver circuit to supply power to the pixels according to operation of a low-power application for displaying a screen with a low on pixel ratio (OPR) value less than a predetermined value; and
controlling the display driver circuit to drive the panel with a reduced frame rate of the signals when the on pixel ratio (OPR) value is less than the predetermined value, the reduced frame rate being lower than a normal mode frame rate,
wherein the OPR value is a ratio of pixels of the panel which are switched on to all pixels included in the panel.

14. The method of claim 13, the method further comprising:
controlling a pixel power supply circuit to stop supplying power when the on pixel ratio (OPR) value is less than the predetermined value.

15. The method of claim 13, the method further comprising:
controlling the display driver circuit to change a frame rate of the signals when the OPR value satisfies a predetermined condition.

16. The method of claim 15, wherein the controlling the display driver circuit to change a frame rate of the signals when the OPR value satisfies a predetermined condition comprising:
controlling the display driver circuit to lower the frame rate of the signals when the OPR value satisfies a predetermined condition.

17. The method of claim 13, the method further comprising:
controlling the display driver circuit to perform gamma correction for the signals and supply the gamma-corrected signals to the panel when the on pixel ratio (OPR) value is less than the predetermined value.

18. The method of claim 13, the method further comprising:
controlling a pixel power supply circuit to supply power while the electronic device is in the normal mode.

19. The method of claim 18, wherein the method further comprising:
controlling the display driver circuit to stop supplying the power.

20. The method of claim 13, wherein the normal mode frame rate is 60 fps.

* * * * *